United States Patent Office 3,037,003
Patented May 29, 1962

3,037,003
PROCESS FOR THE PRODUCTION OF HIGH-MOLECULAR POLYAMIDES
Wolfgang Griehl, Chur, Switzerland, assignor to Inventa A.G. für Forschung und Patentverwertung, Zurich, Switzerland
No Drawing. Filed Nov. 18, 1959, Ser. No. 853,715
Claims priority, application Switzerland Nov. 20, 1958
4 Claims. (Cl. 260—78)

The invention relates to a process for the rapid polymerization of lactams to polyamides.

As is known, the production of polyamides from lactams, such as ε-aminocaprolactam, etc., is carried out in production by heating the lactams in the presence of water or of substances splitting off water to temperatures above the melting point of the polyamide to be obtained. The process usually takes a 10 to 20 hours. It also is known that high-molecular products can be obtained already after a few minutes reaction time when the lactams are heated anhydrously and in the presence of alkaline-reacting substances, such as sodium hydroxide, sodium carbonate, potassium carbonate, lithium hydride and others and especially in the presence of the sodium salt of caprolactam or of other lactams. Organic magnesium compounds also can be used for the purpose. The polyamides thus formed, however, are not particularly suitable for fabrication into plastics, such as films, foils, or fibers, because they lack viscosity-stability, i.e., their melt viscosity and, hence, their molecular weight vary considerably within short periods of time. For instance, the molecular weight attained within 10–15 minutes, which usually is quite high, decreases within one-half hour by approximately 50 percent and steadily decreases even more thereafter so that even after 50 to 100 hours no constant melt viscosity can be attained.

It now has been found that this drawback in the rapid polymerization is averted while the advantages of the process are maintained when for the rapid polymerization of anhydrous lactams, aside from the initiator effecting polymerization, a monoacyl amino carboxylic acid ester is used as co-catalyst.

These esters have the generic formula (1):

R'.CO.NH.R.COOR''    (1)

wherein R denotes an aliphatic, aromatic or hydroaromatic bivalent radical, and R' and R'' are aliphatic, aromatic and heterocyclic radicals which generally may be constituents of carboxylic acids or alcohols.

Depending upon the reaction temperature and on the content of initiator or catalyst and co-catalyst, a polymer is obtained within a few minutes whose viscosity remains stable at the value initially obtained even after many hours. Higher temperatures lead to faster attainment of the desired melt viscosity whereas the amounts of initiator and co-catalyst used influence primarily the viscosity itself.

The incorporation of the co-catalyst in the reaction may be carried out shortly after addition of the initiator, simultaneously therewith, but most advantageously prior to the addition of the initiator, e.g., the acyl amino acid ester can be admixed directly to the lactam to be polymerized. Opportunely, co-catalyst and initiator are used in equimolar amounts.

The monoacyl amino carboxylic acid esters may be unsaturated, may contain oxygen- or sulfur linkages and side chains, may be substituted, etc. As examples of effective compounds the following are named: benzoyl-ε-aminocaproic acid benzyl ester, acetyl-ω-enanthic acid ethyl ester, propionyl-α-aminocaproic acid benzyl ester, acetyl-ω-enanthic acid ethyl ester, propionyl-α-aminobutyric acid octyl ester, p-hexahydrotoluyl-ε-amino-α-methylcaproic acid methyl ester, acetyl-p-amino benzoic acid methyl ester, etc.

The surprising effect of the monoacyl amino carboxylic acid esters is shown in the following Table 1 wherein the progress of several rapid ε-caprolactam polymerizations are compared, initiated with sodium caprolactam.

TABLE 1

| Time (min.) | Degree of Polymerization | | |
|---|---|---|---|
| | 1/200 mol Na-lactam per mol lactam (no co-catalyst) | 1/200 mol Na-lactam, 1/200 mol benzoylamino caproic acid ethyl ester per mol lactam | 1/300 mol Na-lactam, 1/300 mol acetylamino enanthic acid methyl ester per mol lactam |
| 10 | 237 | 150 | 275 |
| 30 | 486 | 162 | 274 |
| 60 | 385 | 160 | 290 |
| 180 | 237 | 160 | 270 |
| 360 | 214 | 155 | 272 |

Fully corresponding values are obtained with ω-amino enantholactam. When, e.g., Grignard compounds such as CH₃MgBr, are used as initiators or catalysts for the rapid polymerization, the degree of polymerization proceeds even more regularly after reaching the maximum possible reaction, since Grignard compounds themselves cause much less strong variations.

The invention now will be more fully described by means of the following examples. However, it should be understood that these are given merely by way of illustration, not of limitation, and that numerous changes may be made in the details without departing from the spirit and the scope of the invention as hereinafter claimed.

*Example 1*

A mixture of 113 g. completely dry ε-caprolactam with 0.88 g. benzoyl-ε-aminocaproic acid ethyl ester were heated to 250° C. Then 0.45 g. sodium ε-caprolactam were added under agitation. The polymerization started immediately after the salt was dissolved, and after 3 minutes a highly viscous melt had formed which only contained the customary 12 percent monomeric caprolactam. The polymerization degree of the melt was 280 and remained substantially unchanged during 6 hours.

*Example 2*

A mixture of 113 g. absolutely dry ε-caprolactam with 1.43 g. acetyl-ε-aminocaproic acid octyl ester was heated to 170° C. Under good agitation 0.68 g. sodium ε-caprolactam were dissolved therein. After approximately 10 minutes the melt began to become viscous while the temperature rose above 200° C. The temperature was raised to 230° C. and a polymer was obtained having an average degree of polymerization of 170. After heating at 230° for 6 hours, the degree of polymerization was 168, i.e., practically unchanged.

*Example 3*

In a mixture of completely dry ω-enantholactam with 2.63 g. benzoyl-ω-aminoenanthic acid methyl ester at 250° C., 1.19 g. methylmagnesium bromide were dissolved with good agitation. The polymerization reaction was finished after 5 minutes, and the polymer obtained had an intrinsic viscosity (measured at 20° C. in m-cresol) of 1.18. After half an hour, a viscosity of 1.20 and after another 5½ hours a viscosity of 1.19 were found. Thus, a practically viscosity-stable product had formed which, at any time, could be fabricated into fibers, foils, films, etc.

Example 4

To a mixture of 113 g. completely dry ε-caprolactam with 0.33 g. benzoyl-ε-aminocaproic acid ethyl ester, 0.169 g. pure sodium ε-caprolactam were added at 250° C. with good agitation. After as short a time as 6 minutes, an extremely viscous melt had formed whose relative viscosity, measured as a 0.5 percent solution in m-cresol at 20° C., was 2.83. The melt was held at 250° C. for 6 hours and thereafter still had a relative solution viscosity of 2.80.

Example 5

In a heatable kettle, 100 kg. freshly distilled ε-caprolactam are melted and 300 g. freshly prepared sodium caprolactam dissolved therein at a temperature of 100° C. Then, 585 g. benzoyl-ε-aminocaproic acid ethyl ester are mixed in, and the mixture allowed to solidify. This mixture is granulated, and these granules are suited for extrusion.

The granulate is extruded within 10 to 30 minutes. The extruder filling opening is at room temperature, its middle zone at 250° C. The temperature of the head is heated in accordance with the prevailing viscosity of the polyamide and with the shape to be imparted. When fibers are to be formed, the temperature of the head and succeeding dosing and shaping die should be 260–280° C. In this manner, cold-stretchable fibers with normal monomer content and good physical and mechanical properties are obtained.

I claim as my invention:

1. In a process for the production of polyamides from lactams having 7 to 10 ring members by rapid catalytic polymerization, the step of heating said lactams in anhydrous state with a co-catalyst, in addition to the catalyst selected from the group consisting of sodium hydroxide, sodium carbonate, potassium carbonate, lithium hydride, sodium caprolactam and methyl magnesium bromide, said co-catalyst consisting of an ester having the generic formula $$R'.CO.NH.R.COOR''$$

wherein R is selected from the group consisting of aliphatic, aromatic and hydroaromatic bivalent radicals, and R' and R'' are selected from the group consisting of aliphatic and aromatic monovalent hydrocarbon radicals.

2. In a process for the production of polyamides from anhydrous lactams having 7 to 10 ring members by rapid catalytic polymerization, the step of heating said lactams with $\frac{1}{100}$ to $\frac{1}{300}$ mols per mol lactam of a co-catalyst, in addition to $\frac{1}{100}$ to $\frac{1}{300}$ mols catalyst per mol lactam, said catalyst being selected from the group consisting of sodium hydroxide, sodium carbonate, potassium carbonate, lithium hydride, sodium caprolactam and methyl magnesium bromide, said co-catalyst consisting of an ester having the generic formula $$R'.CO.NH.R.COOR''$$

wherein R is selected from the group consisting of aliphatic, aromatic and hydroaromatic bivalent radicals, and R' and R'' are selected from the group consisting of aliphatic and aromatic monovalent hydrocarbon radicals.

3. The process as claimed in claim 1, wherin said catalysts and said esters are used in equimolar amounts.

4. The process as claimed in claim 1, wherein said catalysts are added to the mixture of lactam with said esters.

References Cited in the file of this patent

UNITED STATES PATENTS

| | | |
|---|---|---|
| 2,241,322 | Hanford | May 6, 1941 |
| 2,739,959 | Ney et al. | Mar. 27, 1956 |